J. YOUNG & W. L. BAUGH.
AXLE SPINDLE.
APPLICATION FILED FEB. 13, 1912.
1,045,352.
Patented Nov. 26, 1912.
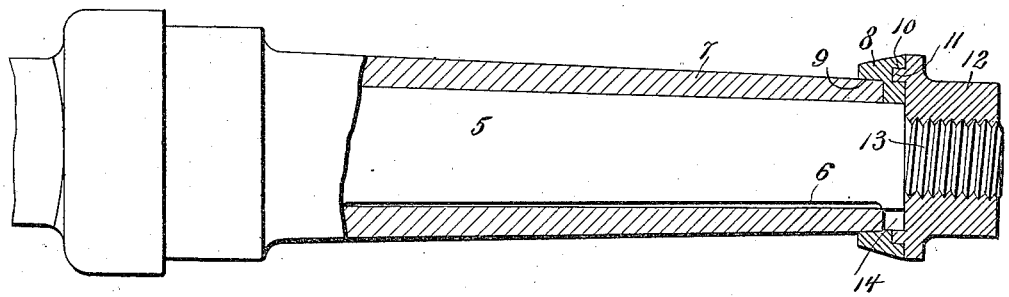
Fig. 1.
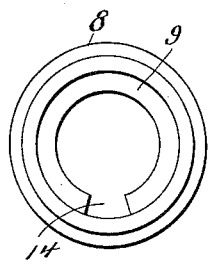 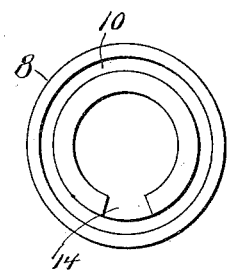 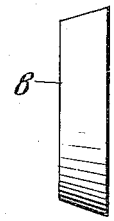
Fig. 2.   Fig. 3.   Fig. 4.
Witnesses
A. R. Walton
G. Barron
Inventors
John Young
William L. Baugh
By Max A. Schmidt
Attorney
COLUMBIA PLANOGRAPH CO., WASHINGTON, D. C.

UNITED STATES PATENT OFFICE.

JOHN YOUNG AND WILLIAM L. BAUGH, OF MOUNT VERNON, MISSOURI; SAID YOUNG ASSIGNOR TO SAID BAUGH.

AXLE-SPINDLE.

1,045,352.            Specification of Letters Patent.      Patented Nov. 26, 1912.

Application filed February 13, 1912. Serial No. 677,347.

*To all whom it may concern:*

Be it known that we, JOHN YOUNG and WILLIAM L. BAUGH, citizens of the United States, residing at Mount Vernon, in the county of Lawrence and State of Missouri, have invented certain new and useful Improvements in Axle-Spindles, of which the following is a specification.

This invention relates more particularly to repair devices for axle spindles which have been worn away so that the axle box no longer properly fits thereon, and its object is to provide a simple, efficient and easily applied device of this kind.

In the accompanying drawing forming a part of this specification, Figure 1 is a sectional view showing the application of the invention. Fig. 2 is a front elevation; Fig. 3, a rear elevation, and Fig. 4, an edge view of the repair device.

Referring specifically to the drawing, 5 denotes an axle spindle which is shown worn away at 6 from continuous use, so that the axle box 7 no longer properly fits. In order to take up this wear and render the spindle fit for further use, there is provided a repair device comprising a washer 8 having an inside diameter so that it may be slipped over the end of the spindle. That side of the washer which is next to the end of the axle box has an annular recess 9 into which the box extends and finds a bearing. In the other side of the washer is an annular groove 10 to receive the annular flange 11 at the base of the axle nut 12, which latter screws on the reduced and threaded outer end 13 of the spindle.

The washer herein described takes up all play of the axle box due to the worn condition of the spindle and makes the latter practically as good as new. The washer can be readily applied to the spindle, and is adapted for any ordinary spindle, no specially constructed spindle being required. It is not necessary to trim or otherwise cut the spindle or the box, and the device is simple and always ready to be put on when the spindle becomes so worn as to render it unfit for further service. The washer may be made in various sizes in order to adapt it for different sized spindles.

It will be noted that the washer is tapered externally so that it will not bind in the hub. The washer also has an internal recess 14 so that it may be lubricated from the axle, the lubricant passing from the latter into the recess.

We claim:

The combination with an axle spindle and its box; of a washer mounted on the end of the spindle and having on one side a recess into which the end of the box extends, the other side of the washer having an annular groove, and a nut screwed on the end of the spindle against the washer, the base of the nut having an annular flange which extends into the aforesaid groove.

In testimony whereof we affix our signatures in presence of two witnesses.

JOHN YOUNG.
           WILLIAM L. BAUGH.

Witnesses:
    D. C. WOODS,
    JOHN E. GROH.

---

Copies of this patent may be obtained for five cents each, by addressing the "Commissioner of Patents, Washington, D. C."